US 012412553B2

(12) United States Patent
Segev et al.

(10) Patent No.: US 12,412,553 B2
(45) Date of Patent: Sep. 9, 2025

(54) APPARATUS, SYSTEM AND METHODS FOR CREATING MUSICAL COMPOSITIONS

(71) Applicant: Loops Lab Ltd, Tel Aviv (IL)

(72) Inventors: Ayal Yona Segev, Tel Aviv (IL); Zeev Jelinek, Ramat Gan (IL)

(73) Assignee: Loops Lab Ltd., Tel Aviv (IL)

( * ) Notice: Subject to any disclaimer, the term of this patent is extended or adjusted under 35 U.S.C. 154(b) by 0 days.

(21) Appl. No.: 18/655,683

(22) Filed: May 6, 2024

(65) Prior Publication Data

US 2024/0371346 A1 Nov. 7, 2024

Related U.S. Application Data

(60) Provisional application No. 63/499,993, filed on May 4, 2023.

(51) Int. Cl.
*G10H 1/00* (2006.01)
*G06K 7/10* (2006.01)

(52) U.S. Cl.
CPC ....... *G10H 1/0025* (2013.01); *G06K 7/10475* (2013.01); *G10H 1/0041* (2013.01); *G10H 2210/105* (2013.01); *G10H 2210/111* (2013.01); *G10H 2220/061* (2013.01); *G10H 2220/155* (2013.01); *G10H 2240/131* (2013.01)

(58) Field of Classification Search
CPC .............. G10H 1/0025; G10H 1/0041; G10H 2210/105; G10H 2210/111; G10H 2220/061; G10H 2220/155; G10H 2240/131; G06K 7/10475
USPC .......................................................... 84/602
See application file for complete search history.

(56) References Cited

U.S. PATENT DOCUMENTS

| | | | |
|---|---|---|---|
| 8,281,997 B2 * | 10/2012 | Moran ................ | G07D 7/2033 235/449 |
| 8,287,327 B1 * | 10/2012 | Ghaly .................... | A63H 3/52 446/330 |
| 8,420,923 B1 * | 4/2013 | Choi ....................... | G10H 1/18 84/476 |

(Continued)

FOREIGN PATENT DOCUMENTS

| | | | |
|---|---|---|---|
| CA | 2721486 A1 * | 10/2009 | .............. F21K 9/00 |
| EP | 3394851 B1 * | 4/2023 | .............. A63F 1/00 |

(Continued)

OTHER PUBLICATIONS

International Search Report/Written Opinion issued in corresponding International Application No. PCT/IL2024/050427 on Oct. 1, 2024; 15 pages.

*Primary Examiner* — Christina M Schreiber
(74) *Attorney, Agent, or Firm* — Smith Gambrell & Russell LLP

(57) ABSTRACT

Apparatuses, systems, and methods are presented for creation of musical compositions based on radio frequency identification (RFID) tags placed on a spot on the surface of a base. The RFID tags transmit a unique identifier (UID) to an RFID reader situated beneath the spot. The UID can be used to play music loops associated with the UID. An on-line database can be queried to determine whether a default music loop set or a new music loop set is to be played. If the default music loop set is retained, then context data can be applied to the music loop set to harmonize the resulting musical composition.

6 Claims, 9 Drawing Sheets

(56) References Cited

U.S. PATENT DOCUMENTS

| | | | |
|---|---|---|---|
| 8,758,111 B2* | 6/2014 | Lutnick | G07F 17/32 |
| | | | 463/16 |
| 10,249,131 B2* | 4/2019 | Nguyen | G07F 17/3272 |
| 10,758,828 B1* | 9/2020 | Howell | A63F 13/63 |
| 2010/0087241 A1* | 4/2010 | Nguyen | G06F 3/04886 |
| | | | 463/17 |
| 2010/0327060 A1* | 12/2010 | Moran | G07D 7/128 |
| | | | 235/440 |
| 2011/0065490 A1* | 3/2011 | Lutnick | G07F 17/3223 |
| | | | 463/16 |
| 2014/0183269 A1* | 7/2014 | Glaser | G06K 19/07701 |
| | | | 235/492 |
| 2016/0179333 A1* | 6/2016 | Shi | G06F 3/0488 |
| | | | 715/863 |
| 2017/0065879 A1* | 3/2017 | Barney | A63F 13/73 |
| 2017/0186411 A1* | 6/2017 | Mintz | A63F 9/24 |
| 2021/0195716 A1* | 6/2021 | Rasmussen | G06F 3/165 |
| 2021/0319773 A1* | 10/2021 | Lachower | G10H 1/0025 |
| 2024/0050871 A1* | 2/2024 | Bulman | G06K 19/0723 |
| 2024/0371346 A1* | 11/2024 | Segev | G10H 1/0008 |

FOREIGN PATENT DOCUMENTS

| | | | | |
|---|---|---|---|---|
| FR | 3108202 B1 * | 4/2022 | | A63H 5/00 |
| KR | 20220040122 A * | 3/2022 | | |
| WO | WO-2015113360 A1 * | 8/2015 | | A63F 13/21 |
| WO | WO-2021180734 A1 * | 9/2021 | | A63H 5/00 |

* cited by examiner

APPARATUS, SYSTEM AND METHODS FOR CREATING MUSICAL COMPOSITIONS

CROSS-REFERENCE TO RELATED APPLICATIONS

This application claims the benefit of and priority to U.S. Provisional Application No. 63/499,993, titled "Apparatus, System and Methods for Creating Musical Compositions," filed on May 4, 2023, which is incorporated by reference in its entirety.

FIELD OF THE INVENTION

The invention is in the field of electronic music.

BACKGROUND OF THE INVENTION

Many people like music but not everyone is capable of playing a musical instrument. Many people that cannot play a musical instrument wish that they could, and many musicians that can play one instrument wish that they could play additional instruments. Even among accomplished musicians, the percentage that can create musical compositions that are pleasing to the ear is small.

BRIEF DESCRIPTION OF THE DRAWINGS

To better understand the invention and to see how it may be carried out in practice, embodiments will now be described, by way of non-limiting examples only, with reference to the accompanying figures. In the figures, identical and similar structures, elements or parts thereof that appear in more than one figure are generally labeled with the same or similar references in the figures in which they appear. Dimensions of components and features shown in the figures are chosen primarily for convenience and clarity of presentation and are not necessarily to scale. The attached figures are.

DETAILED DESCRIPTION OF EXEMPLARY EMBODIMENTS

Figure 1:
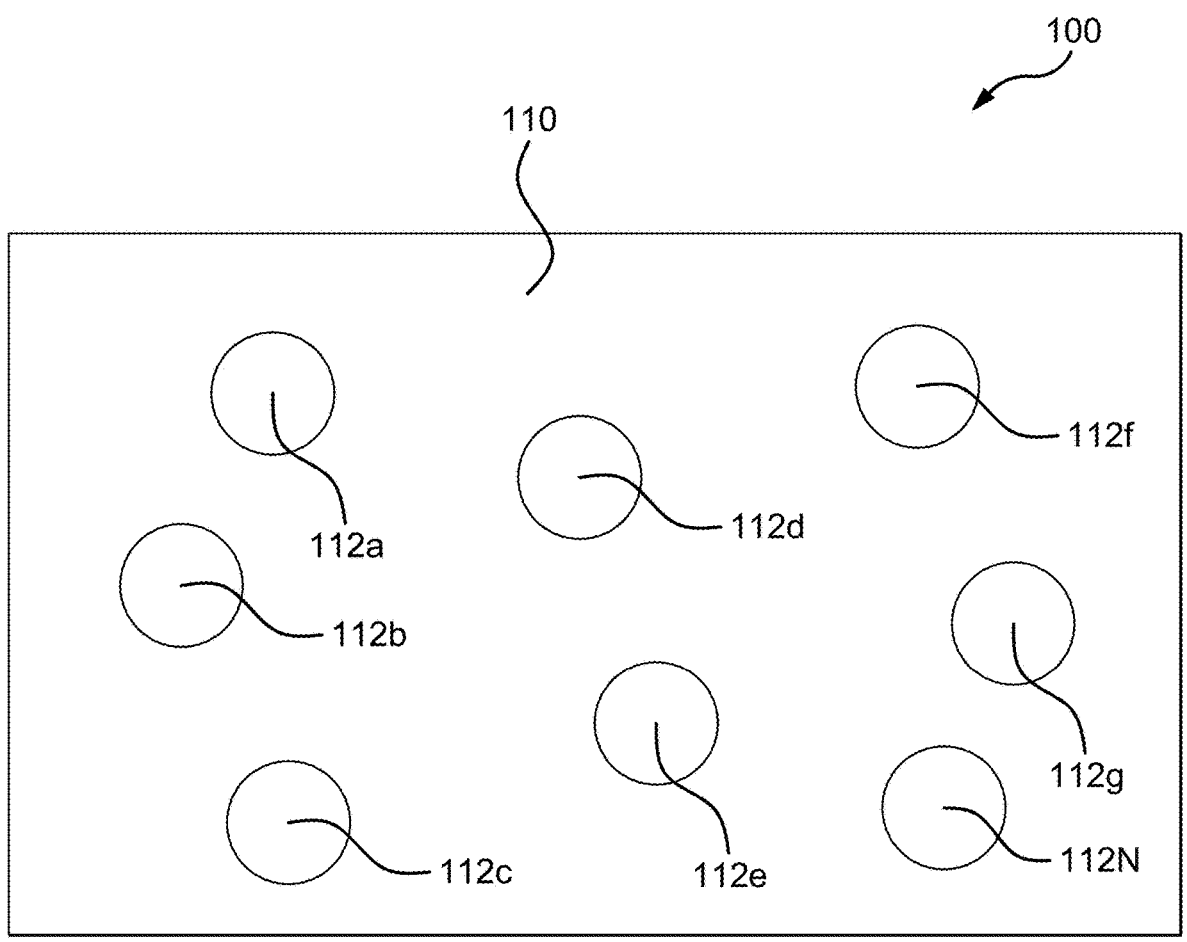
FIG. 1 is a schematic representation of a base with multiple RFID tag readers according to some exemplary embodiments of the invention.

Exemplary (a.k.a., example) embodiments of the invention relate to apparatuses (a.k.a., devices), systems and methods for creating musical compositions. Specifically, some embodiments of the invention can be used to create a harmonious musical composition from a plurality of randomly selected music loops. In some exemplary embodiments the music loops are associated with objects, such as dolls (a.k.a., figures, figurines, statues, or statuettes), having Radio Frequency Identification (RFID) tags encoded with unique identifiers (UIDs), as well as other context data. While some exemplary embodiments refer to dolls, other objects of different types and shapes may apply. A broad aspect of some embodiments of the invention relates to the creation of musical compositions that are pleasing to the ear without any musical training on the part of the user.

The principles and operation of apparatuses, systems and methods according to exemplary embodiments of the invention may be better understood with reference to the drawings and accompanying descriptions.

It will be appreciated that the various aspects described above and below relate to one or more solutions to technical problems associated with the inherent difficulty of learning to compose music.

Alternatively, or additionally, it will be appreciated that the various aspects described herein relate to one or more solutions to technical problems related to a requirement for manual dexterity in order to play music.

Alternatively, or additionally, it will be appreciated that the various aspects described herein relate to a solution to technical problems related to production of cacophonous sounds in computerized compilation of music.

Disclosed systems and apparatuses, and components or subsets thereof (referred to hereinafter as components), should neither be presumed to be exclusive of other disclosed systems, apparatuses, and methods, which may be referred to as exemplary embodiments or some exemplary embodiments. Nor should an apparatus be presumed to be exclusive to its depicted components in an exemplary embodiment or embodiments of this disclosure, unless where clear from context to the contrary. Additionally, blocks as shown in example methods, or operations, can be interchangeable with steps or blocks as shown in other exemplary methods/operations, and do not necessarily need to be performed in the order depicted or described.

The various exemplary embodiments of the invention described below relate to a "music kaleidoscope" in which visual selection of dolls and their placement in different positions on a base produce varied musical compositions. There can be a visual cue on the dolls as to what musical elements are associated with them (e.g., the doll is holding a certain musical instrument, the design and style of the doll, color coding, etc.). In addition, a specific doll may make a different contribution to the final musical output depending on where it is placed on the base and/or when it is placed on the base and/or what other doll(s) are placed on the base together with it.

According to one aspect of some embodiments of the invention, positioning of a plurality of RFID tags on an electronic base equipped with a plurality of RFID tag readers beneath the top surface of the base onto which the dolls are placed, produces a musical composition in the form of a repeating loop of digital music instructions. In some exemplary embodiments of the invention, the RFID tags are associated with objects such as dolls (e.g., on, attached to, disposed within, embedded within, etc.) and can be arranged on certain "spots" on the surface of the base, wherein the surface can also be referred to herein as the "stage." Each RFID tag is encoded with a unique identifier (UID). In exemplary embodiments, a base can have light sources located beneath the surface of the base. One or more of the light sources can be turned ON and OFF, and can also emit different colors of light. In exemplary embodiments, when the lights are turned ON, they can emit light that define position designation indicators that correspond to spots on the base where an object (e.g., doll) containing the RFID tag can be placed.

The base can have residing beneath the surface a plurality of RFID readers, wherein each of the plurality of RFID readers correspond to one of the spots on the surface of the base. The RFID readers can be operable to produce an individual output signal including data related to the RFID reader's spot data, which can indicate the position of the position of a spot corresponding to a specific RFID reader of the plurality of RFID readers. The data can also include time stamp data that can indicate a start and end time for each individual output signal. The output signal can also include the UID associated with the RFID tag placed on one of the spots corresponding to the specific RFID reader.

Each doll, for example using a UID communicated by an RFID tag associated with the doll, can be associated with a music loop set, which can be a set of loops, each of which can be played depending on context. These music loop sets can comprise, for example, a musical piece, music score, melody, tune, song, etc. In example embodiments, this is usually of a single instrument this doll represents. In exemplary embodiments, context data associated with time stamp data, spot data, and the UID can reflect context. This can result in the selection by the base of a music loop of the music loop set. As such, based on context, different loops of the music loop set associated with a UID can be applied.

As for context, in some exemplary embodiments changing the dolls on the base (i.e., taking out one doll and placing another on the stage), which results in a change of the identity of one or more dolls on the base, can change the music loop played by the base (e.g., output by a speaker associated with the base). In exemplary embodiments changing a position of one or more dolls on the base (even without changing the number of dolls, or the identity of any single doll) can change the selection of the music loop from the music loop set. to a modified music loop. That is, changing the position of the dolls from one spot to another can result in the playing of the different music loops selected from the music loop set.

A further aspect of some embodiments of the invention relates to a music generator that compiles two or more music loops into a single music composition. According to various exemplary embodiments of the invention the music generator can compile three, four, five, six, seven, eight or more music loops into a composition. In some exemplary embodiments the maximum number of loops can be determined by the number of RFID tag readers in the base. In some exemplary embodiments, the music generator interacts with a rules engine (e.g., rules engine module). In some exemplary embodiments the rules engine adjusts one or more loops so that all of the loops have a pleasing sound when compiled together into a composition. According to various exemplary embodiments of the invention the rules engine adjusts tempo and/or pitch and/or length and/or gain of one or more music loops.

In some exemplary embodiments of the invention there is provided an apparatus that comprises a base marked with a plurality of position designation indicators, which indicate "spots" on the base where a doll, which can have a RFID tag, can be placed. The indicator can be markings, for example, paint, sticker, or the like, to indicate a spot on the base where a doll can be placed. Alternatively, or additionally, in some embodiments, the apparatus can include one or more lights (e.g., light emitting diode (LED) lights) installed in proximity to each of the position designation indicators.

Alternatively, or additionally, the top surface of the base can be unmarked, but when one or more lights are turned on, the surface is illuminated to create a spot where a doll can be placed. The surface of the base can be made of a transparent material (such as a colored plastic). The illuminated surface can thus provide a position designation indicator. This spot can "appear" or "disappear" (i.e., when lights are turned ON, spots appear and when lights are turned OFF, spots disappear).

Alternatively, or additionally, the apparatus can be operable to change the illumination's property or operation (e.g., turn on different color of LEDs, or direct the lights to flash, flash in a certain frequency, etc.). In exemplary embodiments, the different colors of light signify playing a different spot that will activate a loop from a music loop set associated with the UID. As such the lights can indicate how a musical loop will be played when a doll is placed on a spot. For example, a red light defining a spot might indicate that if a doll is placed on that spot, the apparatus will play the more intense loop (i.e., the loop with more intensity) out of the music loop set associated with the UID of the doll. Thus, the functionality of one or more lights can be indicative of a music loop of a music loop set associated with the UID associated with the RFID tag placed on one or more of the spots.

As mentioned above, the base can have a plurality of RFID readers installed beneath each of the position designation indicators, with each of the RFID readers producing an individual output signal including the position designation (e.g., spot data), time stamp data, and additional information (e.g., UID) from an RFID tag read by the RFID reader. In some embodiments the apparatus includes a signal integrator designed and configured to receive the individual output signals and output a composite output signal indicating for each individual output signal: a position of the position designation indicator corresponding to a specific RFID reader(s), a start time for each individual output signal, and a unique identifier (UID) provided by the RFID tag that is read by the specific RFID reader. Alternatively, or additionally, in some embodiments the apparatus includes: a signal relay configured to receive the individual output signals or the composite output signal as an input and relay the input to an external device. Alternatively, or additionally, in some embodiments the apparatus includes a magnet installed beneath each of the spots on the base. This feature is described further herein.

In some exemplary embodiments of the invention there is provided a system including: (a) a base adapted to read a plurality of RFID tags, and produce one or more output signals containing position designations and unique identifiers (UIDs) from the tags organized in a hierarchy, (b) a database (DB) of UIDs and associated music loop sets defined in terms of musical attributes for each UID; and (c) a music generator configured to receive the one or more output signals containing unique identifiers (UIDs), query the DB with the UIDs, receive a response including a music loop set for each UID/position designation combination, and output a digital music signal based on the music loops and the hierarchy (the hierarchy described herein). The system can behave contextually (i.e., based on context), depending on, for example, the identification, placement, and time of placement of one or more objects (e.g., dolls). Each of these can also have a hierarchy, and as such, the hierarchy of each also provides context. In some embodiments the hierarchy is a temporal hierarchy based on a sequence in which RFID tags are read. Alternatively, or additionally, in some embodiments the hierarchy is a positional hierarchy based on a position on the base at which each RFID tag is read. For example, dolls placed on different spots of the base play different content, such as different loops of a music loop set. Alternatively, or additionally, in some exemplary embodiments the hierarchy is based on an identity of a doll to which a specific RFID tag is attached, wherein the RFID tag can transmit a signal with data identifying the doll.

Alternatively, or additionally, in some embodiments, the musical attributes include one or more members of the group consisting of temporal length, number of bars, BPM (beats per minute), time signature, musical key (pitch), gain (volume), instrument (e.g., drums, guitar), musical role (i.e., base, vocal), and musical style (genre). Alternatively, or additionally, in some embodiments the system includes a rules engine in communication with the music generator, the rules engine providing instructions to adjust or replace one or more of the loops according to the hierarchy.

In some exemplary embodiments of the invention there is provided a music composition method including: (a) installing two or more dolls containing RFID tags on a base containing a plurality of RFID readers at defined positions; and (b) receiving a music output in response to the installation. In some embodiments the method includes changing the music output in response to changing the number, identity, or positions of the dolls on the base. Alternatively, or additionally, in some embodiments the method includes changing the music output by changing the position of one or more of the dolls on the base. Alternatively, or additionally, each doll UID associated with the RFID tag of the doll or object can be associated with themed content that is expressed depending on its context (e.g., which spot the doll is placed, other dolls on the stage, etc.).

In some exemplary embodiments of the invention there is provided: (a) an object (e.g., doll) containing an RFID tag incorporated therein, and (b) coding instructions for a music loop encoded in the RFID tag. Alternatively, or additionally, in some embodiments the coding instructions comprise instructions for a plurality of musical attributes. Alternatively, or additionally, in some embodiments, in an on-line database there is store coding instruction sets corresponding to music loop sets associated with UIDs.

Exemplary Apparatus and System

FIG. 1 is a schematic representation of an apparatus (configured as a base) indicated generally as 100, with multiple RFID tag readers according to some exemplary embodiments of the invention.

Depicted exemplary apparatus 100 can comprise a base 110 marked with a plurality of position designation indicators 112 (112 in the singular, and 112a-N, where N represents some letter, to designate a plurality of position designation indicators) and a plurality of RFID readers (not visible in this figure) installed beneath each of the position designation indicators 112a-N that indicate a spot on the surface of the base. In the depicted embodiment, each of the RFID readers can produce an individual output signal that can include a position designation and additional information from an RFID tag that is read by the RFID reader.

In some exemplary embodiments of the invention, apparatus 100 includes a signal integrator (not depicted) designed and configured to receive the individual output signals and output a composite output signal indicating, for each individual output signal: a position of the position designation indicator corresponding to a specific RFID reader in the plurality of readers (e.g. under position designation indicators 112a-N), a start time and an end time for each individual output signal, a unique identifier (UID) provided by the RFID tag read by the specific RFID reader, and a rules engine (rules engine module) and an on-line database.

In some exemplary embodiments of the invention, apparatus 100 includes a signal relay (not depicted) configured to receive either the individual output signals or the composite output signal as an input and relay the input to an external device. For example, in some embodiments the input is relayed to a device with a data processor and network communication capabilities (such as a smartphone or tablet). According to these embodiments the external device performs a database query as described below in the context of FIG. 2. In other exemplary embodiments of the invention, apparatus 100 is provided as part of a dedicated music player device including a data processor. Alternatively, or additionally, according to various exemplary embodiments of the invention audio speakers are provided either as a part of a device (e.g., smartphone, tablet, or dedicated music player) included in base 110, or as a standalone unit. According to various exemplary embodiments of the invention, communication among hardware components is via either a wireless protocol (e.g. Bluetooth) or via wired connections.

In some exemplary embodiments of the invention, base 110 includes a magnet installed beneath each spot as indicated by position designation indicators 112 (112a-N). In some exemplary embodiments of the invention, the magnets contribute to the ability of a user to properly align an RFID tag with an RFID reader. In some exemplary embodiments of the invention, the magnet provides a tactile confirmation that the RFID tag is properly positioned so as to be readable by the RFID reader (i.e., the object having the RFID tag has been properly placed on the spot). This tactile affirmation is an important part of the user experience. Alternatively, or additionally, in some embodiments the magnet operates (e.g., activates) a switch adjacent to the position designation indicator, and the switch turns on a light or operates an audio output device (e.g. bell or buzzer) to supplement the tactile confirmation with a visual confirmation and/or auditory confirmation that the RFID tag is properly positioned on the RFID reader.

Alternatively, or additionally, as described above, in some embodiments, base 110 includes one or more lights (e.g., LEDs) installed in proximity to each of position designation indicators 112, 112a, etc. In some exemplary embodiments of the invention, the lights are operated according to lighting instructions provided in a music loop. In some embodiments this operation adds a visual dimension to a music loop being played. In some exemplary embodiments of the invention, one of the position designation indicators (e.g. 112a) has a special status as top of hierarchy. The meaning of "top of hierarchy" is described herein.

Figure 2:
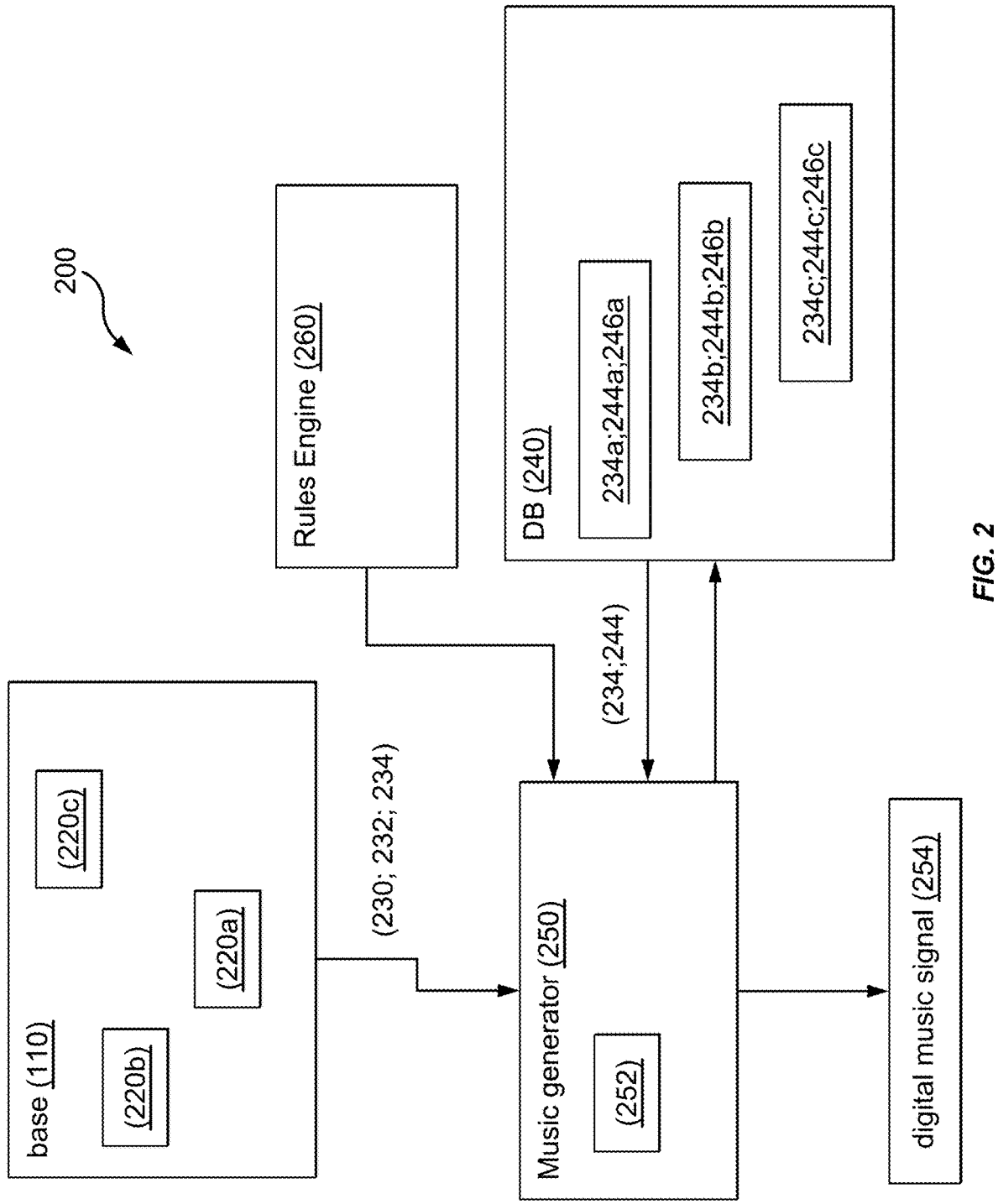
FIG. 2 is a schematic representation of a system according to some exemplary embodiments of the invention.

FIG. 2 is a schematic representation of a system for creating musical composition, indicated generally as 200, according to some exemplary embodiments of the invention.

Depicted exemplary system 200 includes a base (e.g., base 110) adapted to read a plurality of RFID tags (e.g. 220a, 220b and 220c), and produce one or more output signals 230 containing position designations 232 and unique identifiers (UIDs) 234 from the tags organized in a hierarchy.

In the depicted embodiment, exemplary system 200 includes a database (DB) of UIDs (e.g. 234a, 234b and 234c) and associated music loops (e.g. 244a, 244b and 244c) defined in terms of musical attributes (e.g. 246a, 246b and 246c) for each UID. The associated music loops can be stored locally, or remotely (e.g., on-line) in a storage device accessible via a network (e.g., a memory device associated with a server, network attached storage device, storage area network device, etc.). In some exemplary embodiments, the associated music loops for each UID can be changed. For example, one UID of a doll can today be associated with loop A, but later can be associated with loop B. The loops can be stored locally, or on-line. As described above, in some embodiments these musical attributes include instruction for operation of one or more lights.

In the depicted embodiment, exemplary system 200 includes a music generator 250 configured to receive the one or more output signals 230 containing unique identifiers (UIDs) 234, query the DB with the UIDs 234, receive a response including the music loop 244 for each UID 234 and position designation 232 combination and output a digital music signal 254 based on the music loops 244 and the hierarchy. Exemplary hierarchies are explained below.

In some exemplary embodiments of the invention, musical attributes (e.g. 246a, 246b and 246c) include temporal length and/or number of bars and/or BPM (beats per minute) and/or time signature and/or musical key (pitch) and/or gain (volume) and/or role and/or instrument.

In some exemplary embodiments of the invention, system 200 includes a rules engine 260 in communication with music generator 250. According to these embodiments rules engine 260 provides instructions to adjust one or more of loops 244 according to the hierarchy.

According to various exemplary embodiments of the invention, digital music signal 254 is played via speakers in communication with system 200 either via a wireless protocol (such as BLUETOOTH) or via a wired connection. Music can also be stored in a memory device for later playback and/or distribution. Music can also be stored remote from the system (e.g., on-line) at one or more memory devices associated with a remote computer (e.g., network attached storage device, storage area network device, server device having associated with it a memory device, etc.).

Exemplary System Configuration

Referring again to FIG. 2, in some exemplary embodiments of the invention, the RFID tags 220 (*a*), 220 (*b*) and 220 (*c*) carry coding information for music loops 244 (*a*), 244 (*b*) and 244 (*c*) defined in terms of musical attributes 246 (*a*), 246 (*b*) and 246 (*c*) instead of, or in addition to UIDs 234. Implementation of this configuration obviates a need to query database 240 with UIDs 234. In some exemplary embodiments of the invention, obviation of the need for database queries contributes to a reduction in lag time.

EXEMPLARY RULES

Although the description provided above in the context of FIG. 2 relates to interaction among 3 RFID tags, a base with more positions (e.g. 8 as in FIG. 1) is probably a more typical implementation plan. In addition, the objects (e.g., dolls) carrying the RFID tags with UIDs 234 will be available in large numbers. For example, a system with tens of thousands of UIDs 234 is relatively easy to implement. It is envisioned that the library of UIDs 234 will expand over time and users can acquire new items with new UIDs whenever they choose.

Since there are so many UIDS, and each one corresponds to a music loop 244, not every random selection of a subset of loops 244 will automatically produce a pleasant sound when played together (e.g., digitally processed to be the same musical scale, and same beats per minute (BPM)). Rules engine 260 offers a solution to this problem.

As explained in the context of FIG. 2, each loop 244 is defined in terms of music attributes. For example, these attributes include, but are not limited to:
   a. Length of loop in milliseconds
   b. Number of bars (2, 4, 8, 16 . . . )
   c. BPM
   d. Time signature-Beat structure (4/4, 3/4, 6/8)—as the bars and beats need to be synchronized
   e. Key—the musical key in which the loop is originally recorded in (we can use pitch shift effect to change a loop's scale)
   f. Intensity—loops are scaled by how intense they are and their gain (volume) can be adjusted so they are audible when played together with louder loops.
   g. Musical role (e.g., percussion, base, lead, voice)
   h. Musical instrument (e.g., drum, guitar, etc.)
   i. Musical style (genre), Rules engine 260 applies a set of rules to this data to prevent a randomly selected set of loops played concurrently from sounding like noise. For example, when a loop which is in 120 BPM is played together with a loop that is 80 BPM, the slower loop is played ×1.5 in speed to fit the 120 BPM of the first loop.

Alternatively, or additionally, if a loop in scale G is playing and another loop in a different scale is added, rules engine 260 applies a 'pitch shift' to change the scale of the second loop to harmonize with G and make the music sound harmonious.

Alternatively, or additionally, rules engine 260 uses the number of bars in each loop to play them all in sync. For example, a 2-bar loop 4 is played times to synchronize with an 8 bar loop. These rules are provided only as examples for purposes of illustration.

Alternatively, or additionally, rules engine 260 keeps all the loops playing in Phase. This is a challenge if a new item is placed on the base while several other items are already playing. Ideally, when a new UID 234 is added, the effect should be heard immediately. In practice there may be a delay as music generator 250 interacts with DB 240 and rules engine 260. In some exemplary embodiments of the invention, system 200 reduces this delay by storing loops (e.g. 244a: 244b and 244c) with their corresponding music attributes (e.g. 246a: 246b and 246c) in a memory cache 252 of music generator 250 when a specific RFID tag (e.g. 220a: 220b and 220c) is placed in base 110 for the first time. In some embodiments storage of loops and corresponding music attributes in memory cache 252 contributes to a reduction in latency. In some exemplary embodiments of the invention, the delay between placement of a doll on the base 110 and its impact on digital music signal 254 is virtually imperceptible to the listener. The system thus presents an interface which is intuitive and allows real time (e.g., under 200 millisecond delay) interaction. An exemplary way in which this is accomplished is by reading the RFID tag when it is in sufficient proximity to the RDIF reader for it to read an RFID signal generated by the RFID tag. This reading of the RFID tag occurs before the object even touches the base's surface. The system gets the RFID signal before the magnetic tactile affirmation. Reading the RFID signal in advance allows the apparatus to do the needed preparations and gives the perception by the user that when the doll actually touches the base, it starts playing instantly.

Exemplary Hierarchies

In some exemplary embodiments of the invention, the hierarchy is a temporal hierarchy based on a sequence in which RFID tags (e.g. 220, 220b and 220c) are read. For example, if tag 220c is placed on base 110 first, loop 244c will become a dominant loop in the composition and other loops will be adjusted to comport with music attributes 246c. In some embodiments this is accomplished by including a time stamp for each position designation 232 corresponding to each UID 234 in signal 230.

In some embodiments the hierarchy is a positional hierarchy based on a position on the base 110 at which each RFID tag is read. Referring again to FIG. 1, in some embodiments, an RFID tag placed at 112a on base 110 becomes dominant. For the sake of illustration, let's say this is tag 220a. In that case, loop 244a will become a dominant loop in the composition and other loops will be adjusted to comport with music attributes 246a.

In some embodiments this is accomplished by including position designations 232 corresponding to each UID 234 in signal 230.

In other exemplary embodiments of the invention, the hierarchy is based on an identity of a doll to which a specific RFID tag is attached. According to these embodiments each UID 234 includes a dominance score. Music generator 250 reads the dominance scores in UIDs 234 and a music loop 244 corresponding to the UID with the highest score becomes the dominant loop in the composition and other loops will be adjusted or replaced to comport with music attributes (e.g. 246a, 246b and 246c) of this loop.

MORE DETAILS OF EXEMPLARY EMBODIMENTS

Figure 3:
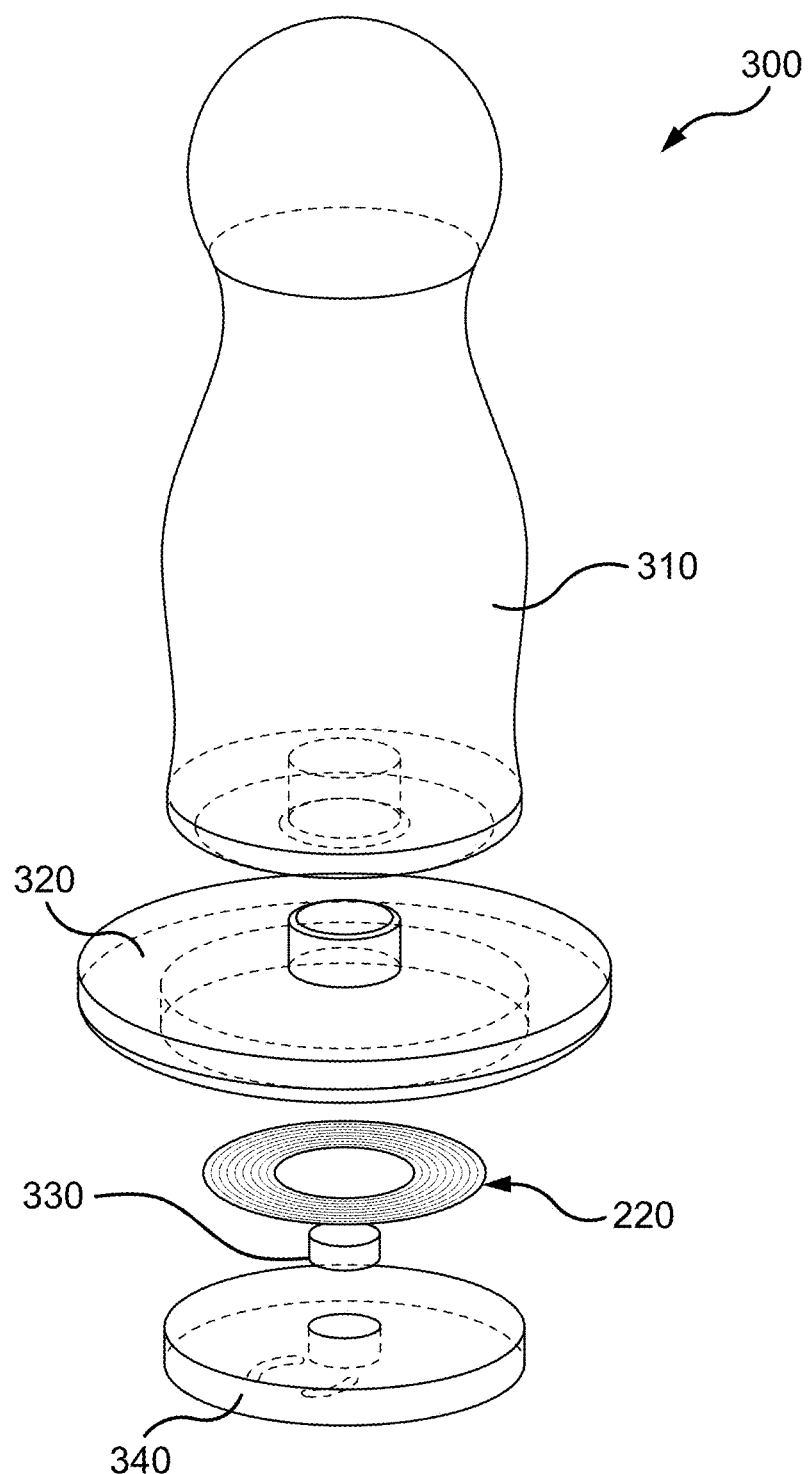
FIG. 3 is a disassembled view of an object that is a doll according to some exemplary embodiments of the invention.

FIG. 3 illustrates an object (e.g., a doll 300) in accordance with exemplary embodiments of the present invention. The doll 300 can comprise a variety of materials, including wood, metal, plastic, porcelain, etc. The doll 300 can comprise a doll body 310. The doll body 310 can be decorated and can have aesthetic features (e.g., arms, hat, cloth clothing, painted patterns, etc.). The doll body 310 can be connected to a doll base 320. Doll base 320 can contain a RFID (e.g., RFID tag 220). The RFID tag can output signals 230 containing UIDs 234a-N, which can be received by the doll base 320 can also contain a doll magnet 330, which, as described above, can attach to the base 110 where any position designation indicators (e.g., position designation indicators 112a-N) are located. A base lid 340 can be attached to the doll base 320 so as to enclose the RFID tag 220 and doll magnet 330 within the doll base 320. In some exemplary embodiments, the RFID tag 220 and doll magnet 330 can be kept in close proximity to each other so as to reduce interference.

Figure 4:
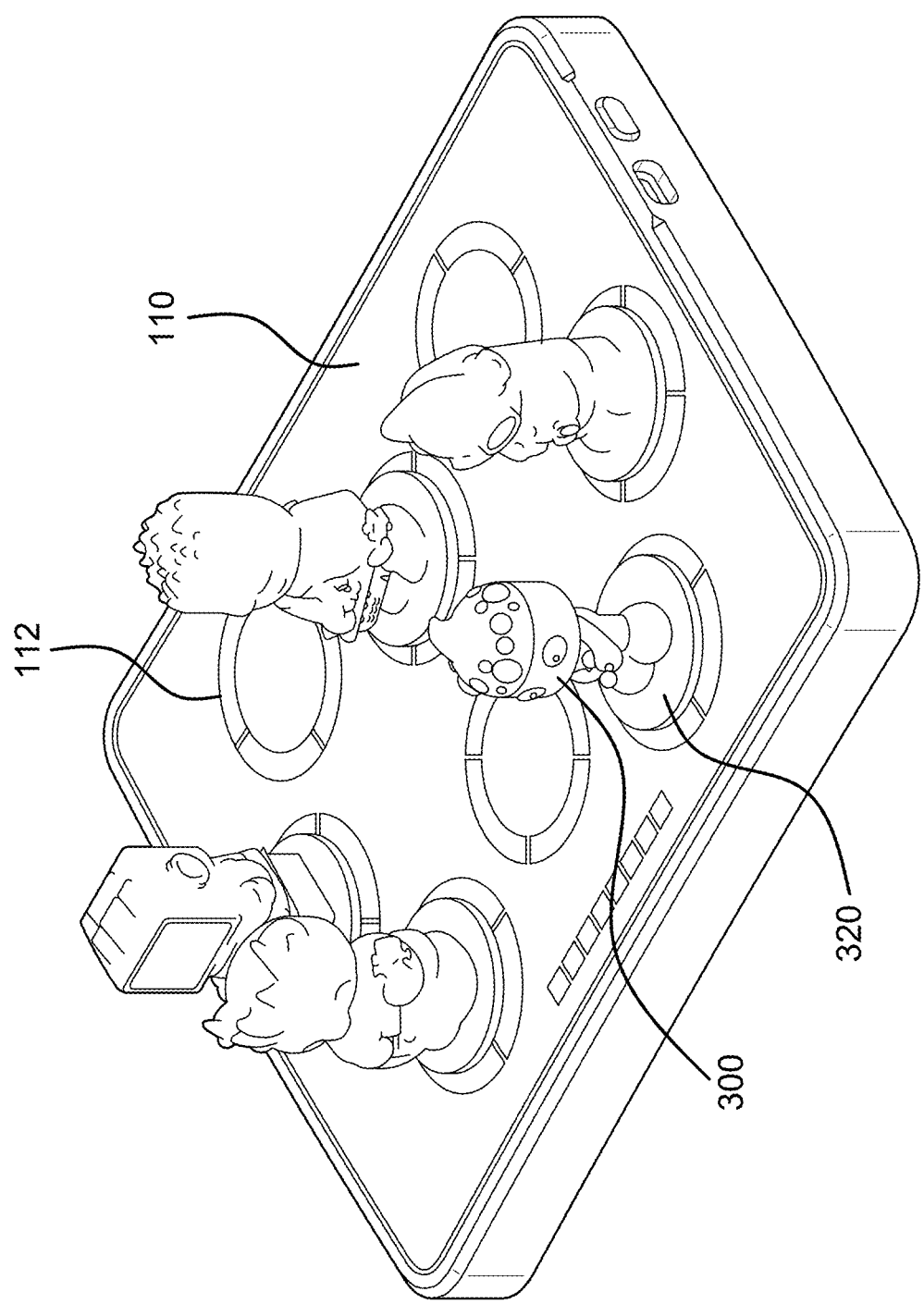
FIG. 4 shows a base having several dolls placed on spots on the base according to some exemplary embodiments of the invention.

FIG. 4 shows a drawing in which a doll 300 (e.g., there can be more than one doll) can be placed on the surface of base 110 at one or more position designation indicators (position designation indicators 112a-N), which can designate a spot. The doll base 300 can attach to the base 110 by way of the doll magnet (e.g., doll magnet 330) being attracted to a magnet in the base 110 underneath each position designation indicator. The position designation indicators can also be luminous, such that a light source (e.g., an LED) can light up underneath and be visible through the surface of the base. The lights can indicate, for example, an order in which to place dolls. The lights, alternatively, can also indicate when a doll 300 has been placed properly and in position (e.g., green light), or placed properly over a position designation indicator 112.

Figure 5:
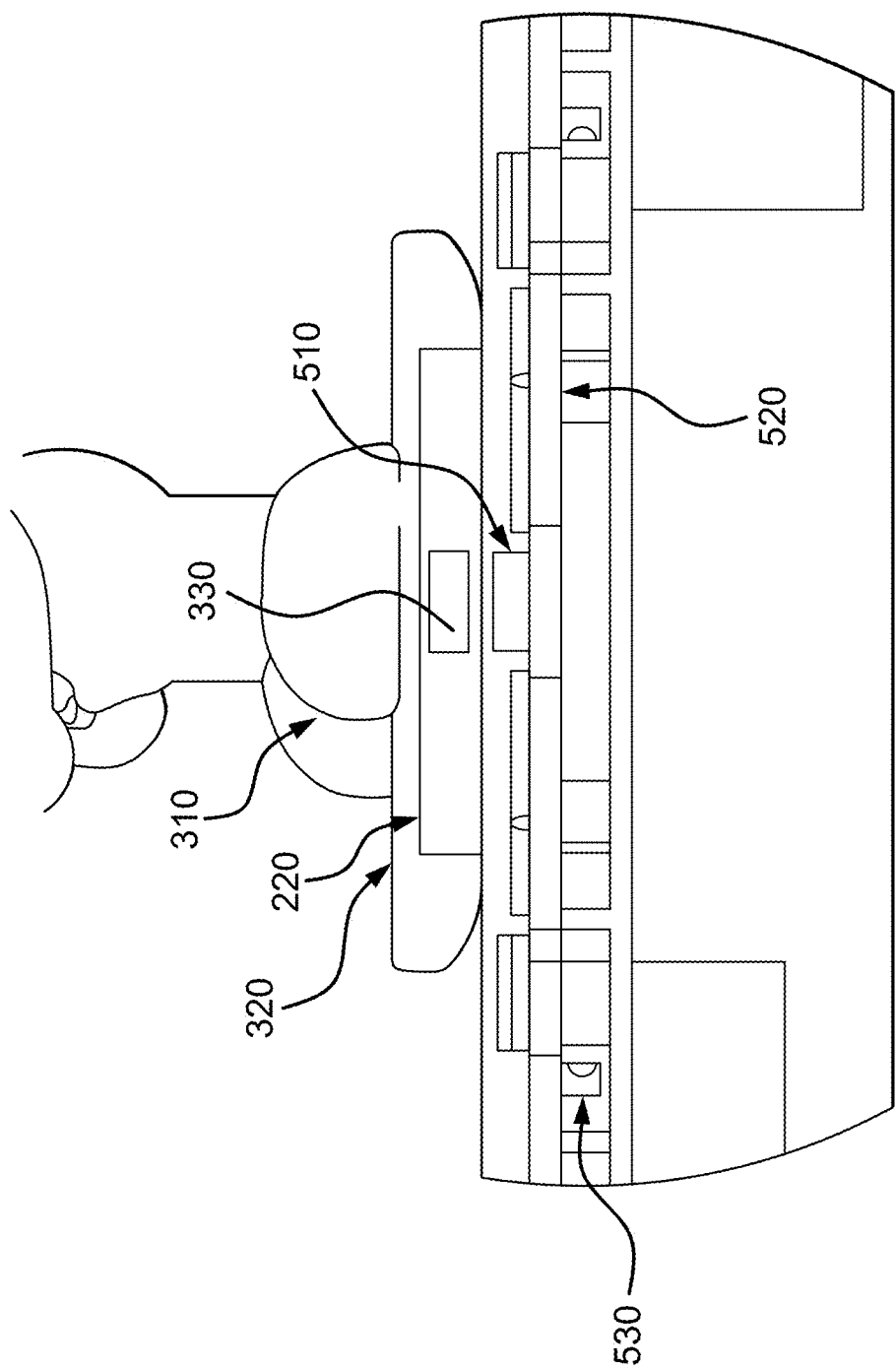
FIG. 5 is a cross section view (side view) of a doll placed on a spot of the base according to some exemplary embodiments of the invention.

FIG. 5 is a side view of the base 110 having a doll 300 placed and magnetically attached on the base 110. The base 110 has, underneath its surface, a base magnet 510 (and base 110 can have one or more base magnets) and an RFID reader 520 (which can be one or more RFID readers) and also one or more LED lights 530.

Of note, in alternative embodiments, instead of using two magnets (in both the doll and in the base), if a doll has a magnet, then instead of base magnets being under the surface of the base 110, a ferromagnetic metal (e.g., iron, nickel, etc.) can be used. Conversely, if the base 110 has a base magnet 510 under the surface of the base, then the doll 300 can have, instead of doll magnet 330, a ferromagnetic metal. As mentioned above, the magnet attraction that attaches the doll 300 with the base 110 provides a tactile confirmation that the doll 300 is positioned properly on a spot.

Figure 6:
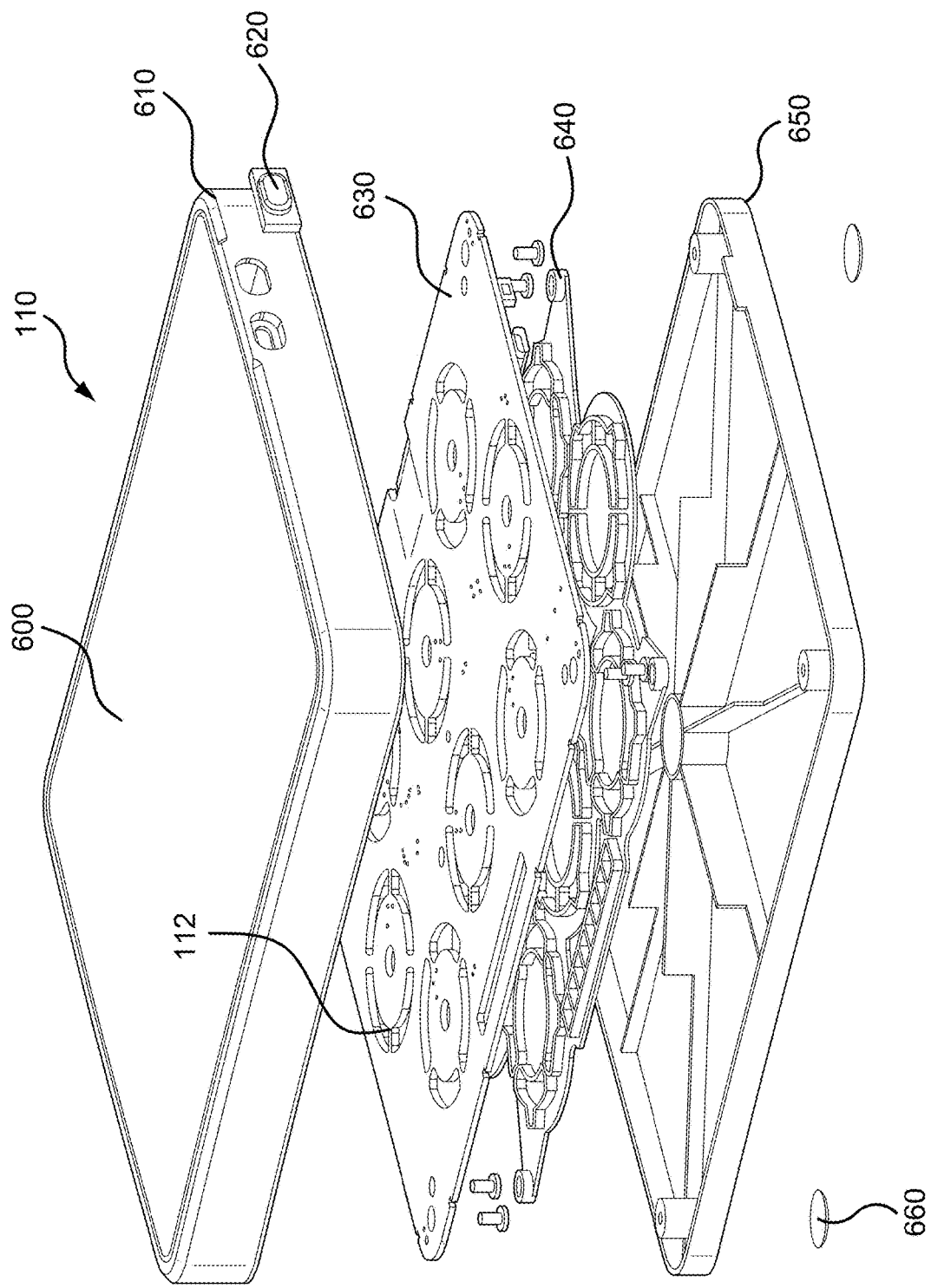
FIG. 6 is a disassembled view of a base according to some exemplary embodiments of the invention.

FIG. 6 depicts a disassembled view of a base 110 in accordance with exemplary embodiments of the present invention. The base 110 can have a top surface 600, wherein the top surface 600 can be the top of the top cover 610. The base 110 can have an on/off button 620 (which can also be a switch) that toggles between the on and off states. The base 110 can also have a printed circuit board (PCB) 630 that has embedded upon it, for example, one or more processors, one or more memories, buses, a Wi-Fi adapter, RFID reader (e.g., RFID reader 520), LEDs, and other electronic components (see, e.g., FIG. 9). A light cover 640, which can protect light sources (e.g., LED light 530 and other LED lights), can attach to the PCB 630, and be situated between the PCB 630 and the back cover 650. Rubber feet 660 can provide elevation for the base 110, and also provide friction so the base 110 does not slide on a surface.

Exemplary Methods

Example operations (methods) that can be performed by the base will be described below with respect to FIG. 8 and FIG. 9. The base can have a microprocessor and a memory (or other non-transitory storage medium) that stores machine readable and executable instructions that, when executed by the microprocessor, facilitate performance of the methods described in this application.

Figure 7:
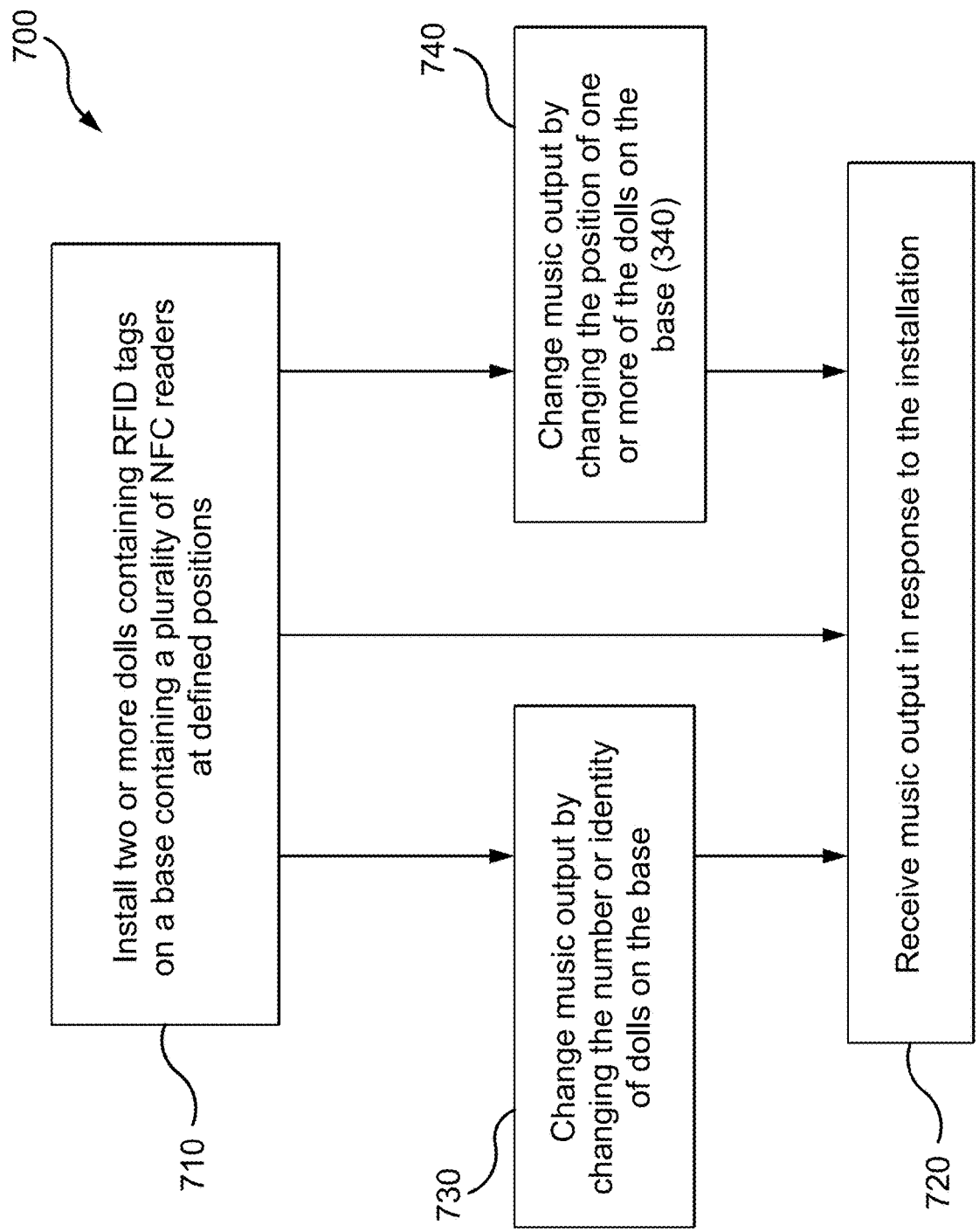
FIG. 7 is a simplified flow diagram of a method according to some exemplary embodiments of the invention.

FIG. 7 is a simplified flow diagram of an example music composition method, indicated generally as 700, according to some exemplary embodiments of the invention.

Depicted exemplary method 700 includes at block 710 installing (or placing, attaching, etc.) two or more objects (e.g., doll 300 and other dolls) containing RFID tags (e.g., RFID tags 220a, 220b, 220c) on a base (e.g., base 110) that contains a plurality of RFID readers (e.g., RFID reader 520 and other RFID readers) at defined positions (e.g., position designation indicators 112a-N) and at block 720 receiving a music output in response to the installation.

In some embodiments method 700 includes at block 730 changing the music output by changing the number or identity of the dolls on the base.

In some embodiments method 700 includes at block 740 changing the music output (e.g., selecting a music loop from a music loop set to be played) based on context (e.g., by changing the position of one or more of the objects.

Figure 8:
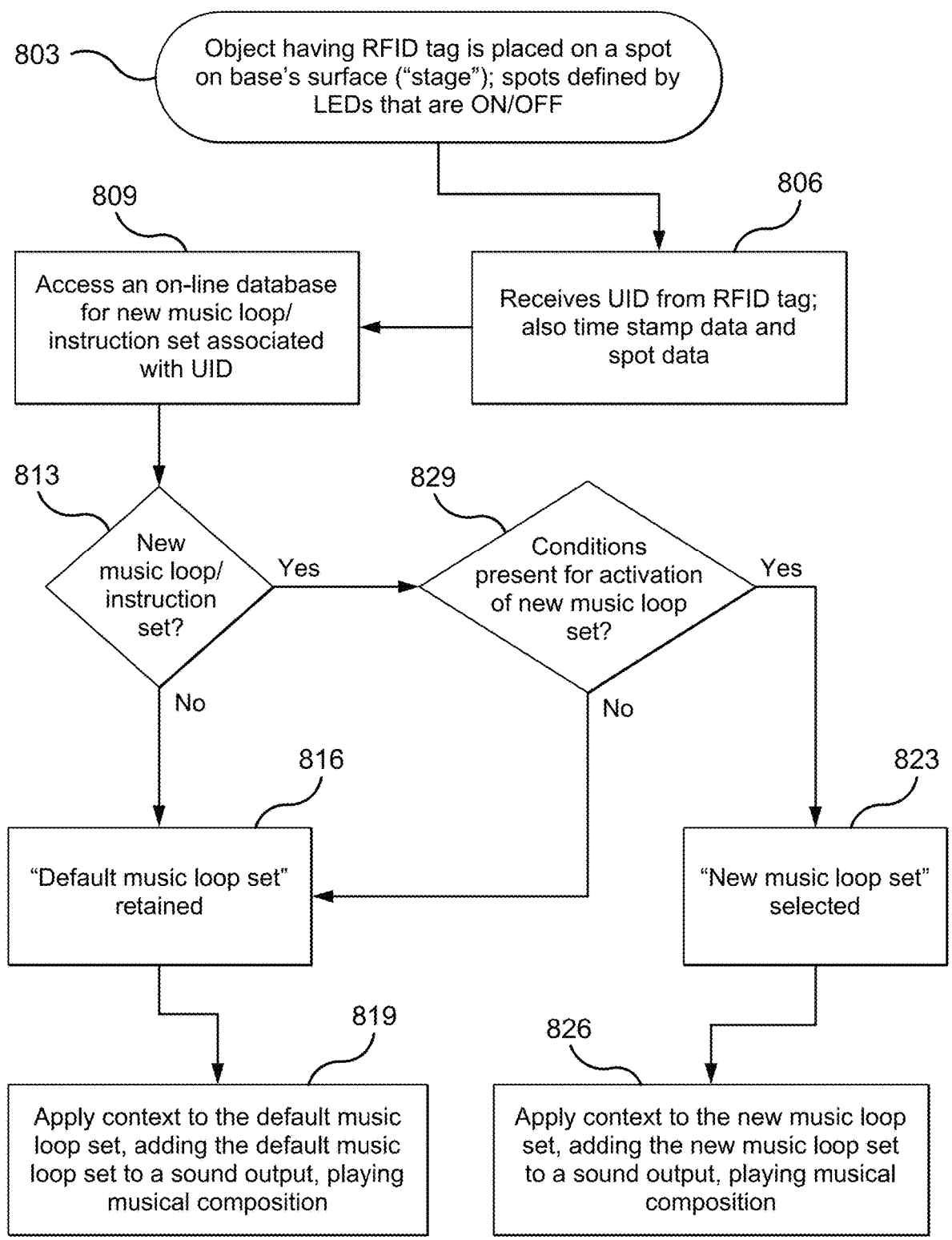
FIG. 8 is a flow diagram of another method according to some exemplary embodiments of the invention.

FIG. 8 illustrates a flow diagram of another example method in accordance with some exemplary embodiments of the present invention. At block 803, an object (e.g., doll 300) with an RFID tag (e.g., RFID tag 220) and musical visual characteristics is placed on a spot of the surface (e.g., surface 600) of the base (e.g., base 110). The spot can be defined by light emitted from light sources (e.g., LED light 530) beneath the spot, the illuminated surface of which provides position designation indicators (e.g., position designation indicator 112) defined by the lights (lights ON indicates a spot onto which a doll can be placed; a spot with the lights OFF underneath indicates that the spot is not available for doll placement. The base can have multiple RFID readers beneath the spots. The base (e.g., the RFID reader associated with the base) can receive a unique identifier (UID) associated with an RFID tag when the RFID tag is placed upon a spot on the surface of the apparatus. As mentioned above, for efficiency, the RFID reader can begin reading the RFID tag before it is in contact with the spot on the surface of the base.

At block 806, the base (e.g., the processor associated with the base) can receive or obtain time stamp data, a spot data that indicates the spot onto which the RFID tag is placed, as well as the UID that the RFID tag sent to and was received by the RFID reader. This data can be used to determine context.

Still referring to FIG. 8, at block 809, the base can access an on-line database that contains instruction sets associated with UIDs. At block 813, the base can query the database to determine whether, based on instructional information in the on-line database, a new music loop set is associated with the UID.

At block 816, in response to a determination that there is no new music loop set associated with the UID, it can continue to use the default music loop set, and at block 819, apply a context (also referred to as context data) to the existing, default music loop set associated with the UID, and add the default music loop set to a sound output. This results in the base playing a musical composition based on the sound output. Context (or context data) can be derived, for example, based on the UID, the time stamp data, the spot type data, one or more other UIDs derived from the one or more additional RFID tags placed on the base at other spots, the arrangement of the RFID tag, order in which the RFID tags are placed (which can change the tempo), and the one or more additional RFID tags, and the sequence in which the RFID tag and the one or more RFID tags were placed. Also, based on the context, the method can comprise making one or more additional spots available for placement of additional RFID tags. Applying the context can comprise selecting one of the loops from a music loop set, and applying modifications comprising one or more of changing a volume, changing a tempo, and changing a pitch, which can result in a harmonious musical composition.

At block 823, in some exemplary embodiments, in response to a determination that the new music loop set is associated with the UID, the base can select the new music loop set (i.e., download it), and at block 826, apply the context to the new music loop set, add the new music loop set to the sound output, and play a musical composition based on the sound output (e.g., using music generator 250).

Alternatively, or additionally, at block 829, the adding of the new music loop set to the sound output can be based on the presence of conditions for activation of the new music loop set. These conditions can comprise, for example, a date and time; positioning of the RFID tags (i.e., which spots the objects having the RFID tag are placed upon), identities of other RFID tags that are placed upon the surface (e.g., if the "stage" opens up and more dolls are placed on it), and updated content (e.g., skins, mods, other elements, etc.) based on, for example, user settings (e.g., user-generated content, user-purchased content, etc.).

Alternatively, or additionally, in some exemplary embodiments, the method can comprise turning on and off lights (located beneath the surface of the base) and changing the light's colors to provide interactive cues to indicate which spots are available, indicate the intensity of a loop from a music loop set, associated with the spot, indicate the designated spots that result in new music loop sets, indicate which RFID tags should be placed on the spot, and indicate general timing instructions (e.g., Flash the lights to indicate to the user as to when, or what moment, is the appropriate time to put one or more objects with RFID tags on the surface). Emitting different colors of light can also signify playing a different spot that will activate a loop from a music loop set (e.g., default music loop set) associated with the UID.

Exemplary Electronic Components

Figure 9:
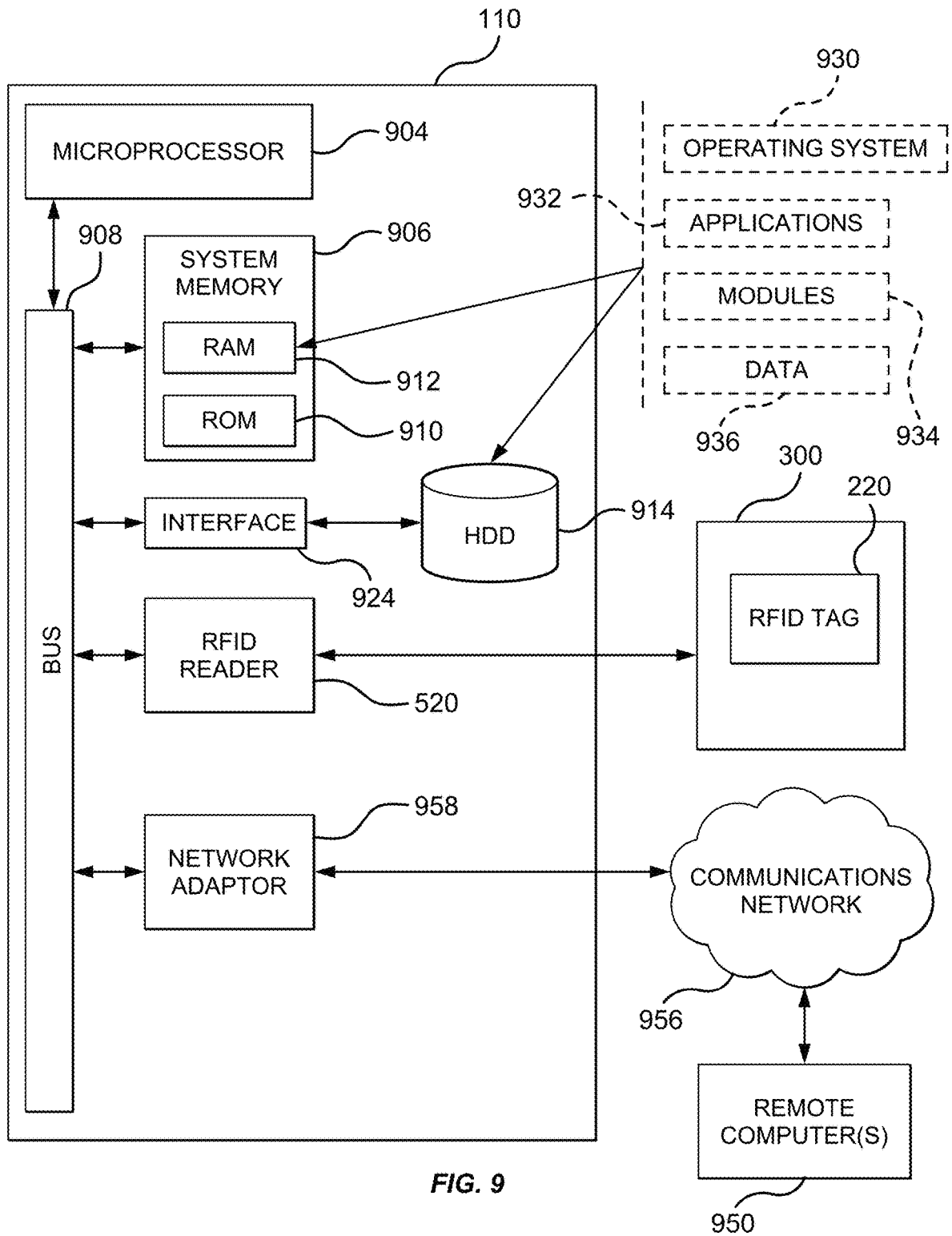
FIG. 9 depicts some computing components that may be used according to some exemplary embodiments of the invention.

Now moving to FIG. 9, the example apparatuses and systems, including those that comprise the base (base 110), in accordance with exemplary embodiments of the present application, can include electronics-related components that enable operation of the exemplary embodiments. Such components can be embedded on, or reside on, a PCB (e.g., PCB 630). Such components can comprise a microprocessor 904 (of referred to as a processing unit, central processing unit, processor). The microprocessor 904 (which can also be one or more microprocessors) can execute machine executable instructions (e.g., computer program product, computer-readable instructions, software, software programs, software applications, software modules, etc.) to facilitate performance of the operations (e.g., functions, methods, processes, and logic flows) described herein.

The microprocessor 904 can be any of various commercially available processors capable of performing the functions described herein, and can include brands sold by Intel, AMD, etc.

Still referring to FIG. 9, the base can also comprise a computer readable media, such as memory 906, which can include read-only memory ROM 910, a non-volatile memory, and random-access memory RAM 912. The ROM 910 can store, for example, a basic input/output system (BIOS), an operating system 930, applications 932 of the base, and other computer modules 934, and generated data 936. The RAM 912, which is often called "working memory," can also include a high-speed RAM such as static RAM for caching data. Other tangible and/or non-transitory media can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

A system bus 908 can connect system components including, but not limited to, system memory 906 to the microprocessor 904. The system bus 908 can be any of several types of bus structure that can further interconnect to a memory bus (with or without a memory controller), a peripheral bus, and a local bus using any of a variety of commercially available bus architectures.

The base can also comprise an internal hard disk drive (HDD) 914 (e.g., EIDE, SATA), which can be connected via a storage interface 924 to the system bus 908. The base can also interface (e.g., USB interface) with any number of external storage devices (e.g., a memory stick or flash drive reader can allow a flash drive to be connected to the recycling printer, to facilitate printing of documents stored on the flash drive). Additionally, a solid-state drive (SSD) could be used in addition to, or in place of, an HDD 914.

The base comprises RFID readers (e.g., RFID reader 520) to receipt RFID signals from an RFID tag associated with a doll (RFID tag 220, doll 300). The base can operate in a networked environment using logical connections via wired and/or wireless communications via a communications network 956 to one or more remote computers, such as a remote computer 950. The remote computer 950 can be a server with access to networked storage (e.g., cloud storage devices), a desktop computer, laptop, smartphone, tablet, or the like. The on-line storage devices can hold, for example, different event and context data, as well as different loops of music. The communications network can be a local area network (LAN, which can be a wired or wireless network, such as a Wi-Fi network. The communications network can also comprise larger networks (e.g., a wide area network (WAN)) that facilitate enterprise-wide computer networks, such as intranets, all of which can connect to a global communications network, e.g., the Internet. A wireless communication network interface or network adapter 958 can facilitate wired or wireless communication to the communications network 956.

It is expected that during the life of this patent many relevant communication protocols will be developed and the scope of the invention is intended to include all such new technologies a priori.

Having described exemplary embodiments, it is to be understood that the invention is not limited in its application to the details set forth in the description herein or exemplified by the examples. The invention is capable of other embodiments or of being practiced or carried out in various ways. Also, it is to be understood that the phraseology and terminology employed herein is for the purpose of description and should not be regarded as limiting.

Unless otherwise defined, all technical and scientific terms used herein have the same meaning as commonly understood by one of ordinary skill in the art to which this invention belongs. Although suitable methods and materials are described below, methods and materials similar to or equivalent to those described herein can be used in the practice of the present invention. In case of conflict, the patent specification, including definitions, will control. All materials, methods, and examples are illustrative only and are not intended to be limiting.

As used herein, the terms "comprising" and "including," or grammatical variants thereof, are to be taken as specifying inclusion of the stated features, integers, actions or components without precluding the addition of one or more additional features, integers, actions, components or groups thereof. This term is broader than, and includes the terms "consisting of" and "consisting essentially of" as defined by the Manual of Patent Examination Procedure of the United States Patent and Trademark Office. Thus, any recitation that an embodiment "includes" or "comprises" a feature is a specific statement that sub embodiments "consist essentially of" and/or "consist of" the recited feature.

The phrase "consisting essentially of" or grammatical variants thereof when used herein are to be taken as specifying the stated features, integers, steps or components but do not preclude the addition of one or more additional features, integers, steps, components or groups thereof but only if the additional features, integers, steps, components or groups thereof do not materially alter the basic and novel characteristics of the claimed composition, device or method.

The phrase "adapted to" as used in this specification and the accompanying claims imposes additional structural limitations on a previously recited component.

The term "method" refers to manners, means, techniques and procedures for accomplishing a given task including, but not limited to, those manners, means, techniques and procedures either known to, or readily developed from known manners, means, techniques and procedures by practitioners of architecture and/or computer science.

The terms "include", and "have" and their conjugates as used herein mean "including but not necessarily limited to".

The term "facilitates" as used herein is in the context of a system, apparatus, or component "facilitating" one or more actions, methods, or example operations, in respect of the nature of complex computing environments in which multiple components and/or multiple devices can be involved in some computing operations. Non-limiting examples of actions that may or may not involve multiple components and/or multiple devices comprise the methods described herein, including but not limited to transmitting or receiving data, establishing a connection between devices, determining intermediate results toward obtaining a result, etc. In this regard, a computing device or component can facilitate an operation by playing any part in accomplishing the operation (e.g., directing, controlling, enabling, etc.). When operations of a component are described herein, it is thus to be understood that where the operations are described as facilitated by the component, the operations can be optionally completed with the cooperation of one or more other computing devices or components, such as, but not limited to, processors, application specific integrated circuits (ASICs), sensors, audio and/or visual output devices, other devices, etc.

Implementation of the method and system according to exemplary embodiments of the invention can involve performing or completing selected tasks or steps manually, automatically, or a combination thereof. Moreover, according to actual instrumentation and equipment of exemplary embodiments of methods, apparatus and systems of the invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

Although the invention has been described in conjunction with specific embodiments thereof, it is evident that many alternatives, modifications, and variations will be apparent to those skilled in the art. Accordingly, it is intended to embrace all such alternatives, modifications and variations that fall within the spirit and broad scope of the appended claims.

Specifically, a variety of numerical indicators have been utilized. It should be understood that these numerical indicators could vary even further based upon a variety of engineering principles, materials, intended use and designs incorporated into the various embodiments of the invention. Additionally, components and/or actions ascribed to exemplary embodiments of the invention and depicted as a single unit may be divided into subunits. Conversely, components and/or actions ascribed to exemplary embodiments of the invention and depicted as sub-units/individual actions may be combined into a single unit/action with the described/depicted function.

Alternatively, or additionally, features used to describe a method can be used to characterize an apparatus and features used to describe an apparatus can be used to characterize a method.

It should be further understood that the individual features described hereinabove can be combined in all possible combinations and sub-combinations to produce additional embodiments of the invention. The examples given above are exemplary in nature and are not intended to limit the scope of the invention which is defined solely by the following claims.

Each recitation of an embodiment of the invention that includes a specific feature, part, component, module or process is an explicit statement that additional embodiments of the invention not including the recited feature, part, component, module or process exist.

All publications, references, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The invention claimed is:

1. A device comprising:
a doll base;
a base lid attached to the doll base so as to enclose a radio frequency identification (RFID) tag and a doll magnet within the doll base, wherein the RFID tag is operable to transmit an output signal comprising a unique identifier (UID) to a base apparatus, and wherein the RFID tag is positioned in proximity around the doll magnet to avoid neutralizing the RFID tag and reduce interference when the output signal is transmitted to the base apparatus, the base apparatus comprising:
one or more light sources located beneath a surface of the base that, when turned on, emit light that define position designation indicators that correspond to spots on the base apparatus where the device containing the RFID tag can be placed, wherein the one or more light sources are operable to:
be turned on and off, and
emit different colors of light; and
a plurality of RFID readers, wherein each of the plurality of RFID readers:
reside beneath the surface of the base apparatus and correspond to one of the spots of the, and
are operable to receive the UID transmitted by the RFID tag and produce an individual output signal including data related to its spot position and additional information comprising the UID.

2. The device of claim 1, wherein the base apparatus further comprises a signal integrator designed and configured to receive the individual output signal and output a composite output signal comprising information related to:
the position of a spot corresponding to a specific RFID reader of the plurality of RFID readers;
a start and end time for each individual output signal;
the UID associated the RFID tag placed on one of the spots corresponding to the specific RFID reader; and
a rules engine and an on-line database.

3. The device of claim 1, wherein the base apparatus further comprises a signal relay configured to receive individual output signals or a composite output signal as an input, and relay the input to an external device.

4. The device of claim 1, wherein the base apparatus further comprises magnets installed beneath each of the spots that can attract the device.

5. The device of claim 1, wherein the different colors of light emitted by the one or more light sources are indicative of a music loop of a music loop set associated with the UID associated with the RFID tag placed on one or more of the spots.

6. The device of claim 1, wherein the different colors of light signify activation of a loop from a default set of loops associated with the UID.

* * * * *